Dec. 16, 1969　　　R. C. WEATHERSTON　　　3,484,823
MULTIRECOMPRESSION HEATER AND/OR HIGH TEMPERATURE COMPRESSOR
Filed Dec. 15, 1967　　　3 Sheets-Sheet 1

INVENTOR
ROGER C. WEATHERSTON.

BY

ATTORNEY

INVENTOR
ROGER C. WEATHERSTON.
BY
ATTORNEY

Dec. 16, 1969   R. C. WEATHERSTON   3,484,823
MULTIRECOMPRESSION HEATER AND/OR HIGH TEMPERATURE COMPRESSOR
Filed Dec. 15, 1967   3 Sheets-Sheet 3

INVENTOR
ROGER C. WEATHERSTON.
BY
ATTORNEY

United States Patent Office 3,484,823
Patented Dec. 16, 1969

3,484,823
MULTIRECOMPRESSION HEATER AND/OR HIGH TEMPERATURE COMPRESSOR
Roger C. Weatherston, Williamsville, N.Y., assignor to Cornell Aeronautical Laboratory, Inc., Buffalo, N.Y., a corporation of New York
Filed Dec. 15, 1967, Ser. No. 690,988
Int. Cl. F04c *17/10, 29/04*
U.S. Cl. 230—141                                    16 Claims

ABSTRACT OF THE DISCLOSURE

A multirecompression heater having a pair of gear-type working elements for increasing the energy and temperature of an inlet gas by a plurality of expansion and recompression processes including cooling ducts within the housing and layers of heat reflective material on the housing interior surface and on the working elements, one embodiment of which includes introducing the inlet gas directly into the outlet chamber.

BACKGROUND OF THE INVENTION

The present invention relates to a new type of gas heater for generating sustained flows of high temperature and pressure for hypersonic flight simulation.

The space age requirements for aerodynamic, material and structural testing are significantly different from conditions of airplane flight. The conditions of temperature, pressure and velocity that are encountered by orbital space vehicles upon their entry into the earth's atmosphere are only partially met by existing test facilities. The development of the hypersonic ramjet also is somewhat impeded for lack of a suitable test facility.

There are numerous shock tube or shock tunnel-type facilities that provide useful simulation testing but the test time of such facilities is so short, on the order of a few milliseconds, that only certain types of tests can be carried out.

The testing needs for these devices have been partially fulfilled by the Wave Superheater Facility at Cornell Aeronautical Laboratory, Inc. and by numerous arcjet facilities. While the superheater generates air at much higher pressures than comparable flow arcjet facilities and while the arcjet generates very high temperature flows, neither of these devices generates the proper combination of pressure and temperature to satisfactorily fill the testing needs for hypersonic flight.

The wave superheater compresses and heats air mechanically in a tube by the action of a very fast moving air piston which is driven by a high energy helium gas. A fundamental limitation of this device is associated with the very high tube length to diameter ratios which are an operational necessity. The resultant surface area to flow rate is high and severe heat attenuation effects are encountered.

SUMMARY OF THE INVENTION

The foregoing, as well as other, disadvantages are overcome according to the present invention which provides a multirecompression heater that heats test gas by mechanical action, like the superheater, but by contrast, will function with very low ratios of surface area to flow rate. Thus, the pressure and temperature losses are small.

Basically, the multirecompression heater according to the present invention comprises; a housing, mating working elements in the form of a pair of rotatable gear members mounted in the housing each having alternately spaced peripheral lobes and wells, means for driving said working elements, inlet passage means for delivering a relatively low temperature gaseous fluid to the interior of said housing, a high temperature outlet region defined by said working elements and the housing, outlet passage means communicating with said outlet region for delivering high temperature gaseous fluid to a point of use, the portions of the housing adjacent the outlet region have curved interior surfaces following the contour of the working elements, means for supplying under externally derived pressure a coolant fluid to the working elements as they rotate out of said outlet region, and means to remove to an external receiver substantially all of said coolant fluid from the wells of said working elements before exposure thereof to said inlet passage means.

There is thus provided a heater mechanism wherein; the amount of work done on the gas is very high in comparison to the contact area of the gas to the mechanism proper, wherein blunt mechanical surfaces act on the gas thereby to achieve low heat transfer rates, and wherein the working members are alternately exposed and withdrawn from the high temperature gas to facilitate cooling thereof.

BRIEF DESCRIPTION OF THE DRAWINGS

For a more fuller understanding of the present invention reference should be had to the following detailed description thereof taken in conjunction with the accompanying drawings, wherein.

DESCRIPTION OF THE PREFERRED EMBODIMENTS

Figure 1:
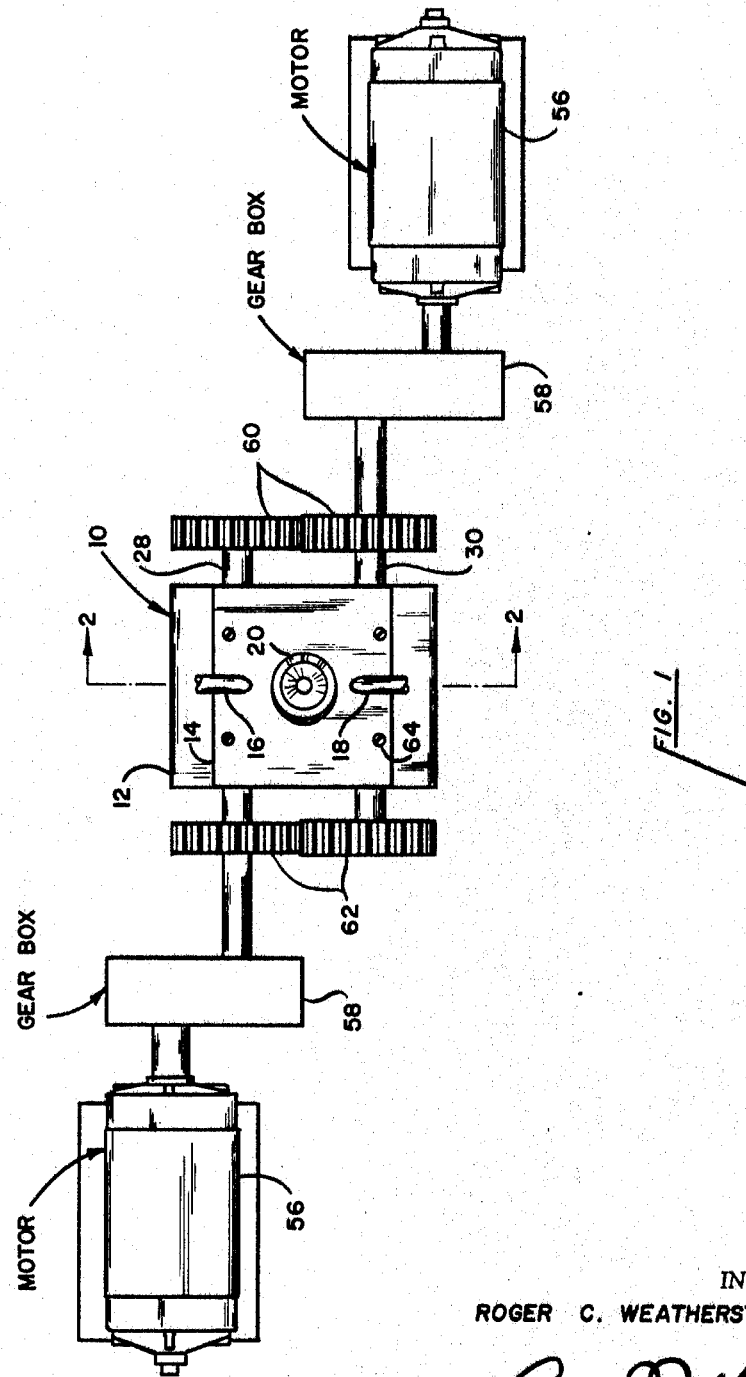
FIGURE 1 is a top plan view of the multirecompression heater of the present invention embodying the exterior features thereof.

Referring now to the drawings and, more particularly, to the embodiments illustrated in FIGURES 1–4, the heater proper is depicted generally at 10, the exterior housing of which is defined by a casing 12 and a cover plate 14, which contains inlet passages 16 and 18 and an outlet passage 20. Casing 12 is generally parallelepiped in shape, having a generally rectangular opening 22 in a top wall thereof, two circular openings 24 in one side wall thereof and two circular openings 26, each coaxial with respective openings 24, in an opposite side wall thereof.

A pair of shafts 28 and 30 pass through and are supported by, in rotatable relation, each set of opposed circular openings 24 and 26. Conventional bearings and seals (not shown) may be provided in the openings for the shafts. Interiorly of casing 12 shaft 30 is further supported by a pair of air bearings 32. A similar pair of air bearings are provided for the support of shaft 32, only one of which is shown at 34 in FIGURE 4. Each of the air bearings have a cylindrical surface 36 for supporting the cylindrical surface of each of the shafts over an arc length of about 90° thereof along a lower and outer portion as viewed in FIGURE 4. An arcuate recess 38 is provided in each air bearing surface 36 and communicating therewith at one end is a passage 40. The other end of passage 40 communicates through an opening in casing 12 with line 42 leading to a source of pressurized air (not shown).

Interiorly of casing 12 two working elements 44 and 46 are fixedly mounted on respective shafts 28 and 30 as by keying 48 or the like. Each working element comprises a cylindrical gear member having spaced peripheral teeth or lobes 50 separated by peripheral wells 52. For a purpose to be discussed hereinbelow, the entire outer periphery of each of the working elements is coated with a highly heat reflective material 54, such as aluminum oxide, for example. Working elements 44 and 46 are adapted to be driven at a high rate of speed by a pair of identical motors 56, through suitable gearing 58 and synchronizing gear pairs 60 and 62.

As shown in FIGURE 1, the gearing 58, gear pairs 60 and 62, and the motors 56 are generally symmetrically arranged about housing 12. This tends to keep the power level of the synchronizing gears low which really serve only to index the working elements.

Gears 60 and 62 are precision made and mate with little or no backlash such that the working elements 44 and 46 are maintained in a close spaced, but no-touch relationship. Such a no-contact relationship is required to avoid wear on the working elements, that would otherwise occur due to the extremely high speeds and the lack of lubrication. No lubrication is desirable in order to maintain the test gas free from impurities and contamination.

Figure 3:
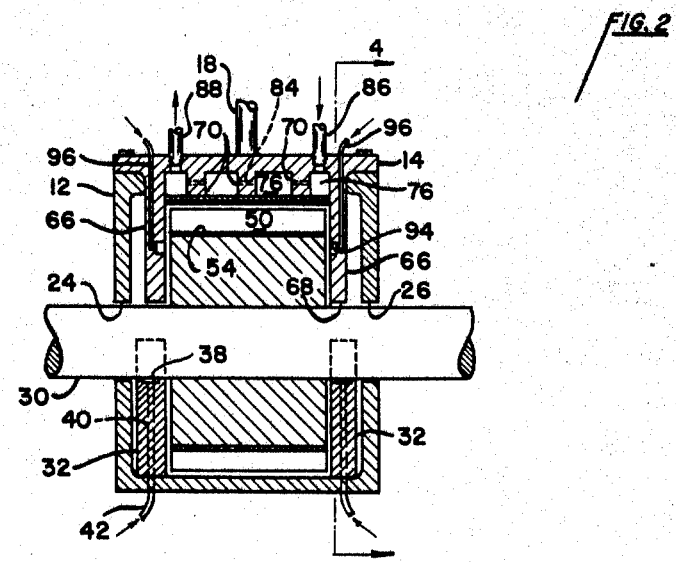
FIGURE 3 is a sectional view taken along line 3—3 of FIGURE 2.

Cover plate 14 is suitably mounted to casing 12 by means of bolts 64 or the like. A pair of depending side walls 66, integral with plate 14, pass through casing opening 22 and terminate in cylindrical surfaces 68. Surfaces 68 are in close spaced relation to shafts 28 and 36, follow the contours thereof for an arc of about 90° and are diametrically opposed to surfaces 36 of air bearings 34. Between side walls 66 a plurality of depending fingers 70 extend from plate 14 and terminate in curved bottom surfaces 72 adjacent the periphery of working elements 44, 46, closely following the contours thereof. As shown in FIGURE 3, the fingers and side walls define a plurality of inverted U-shaped channels 76. Channels 76 are fully closed by means of a sheet of thermally conductive material 78, such as copper, that extends from one end 80 of channels 76 along bottom surfaces 72 thereof to the other end 82 thereof, to thereby define a plurality of arcuate ducts adjacent the peripheral surfaces of the working members 44 and 46. Each channel 76 is in fluid communication with each other channel by means of through passages 84 in fingers 70. A coolant fluid such as water is adapted to circulate through the channels 76, entering from a suitable source (not shown) by way of line 86 and exiting by way of return line 88. Although as shown the cooling ducts terminate at end 82, it is obvious that they can be extended to provide cooling to the walls of outlet passage 20 and the portion of region 90 immediately adjacent thereto. Alternately, separate cooling ducts can be provided for this purpose.

Outlet passage 20 integral with plate 14 and located centrally thereof communicates interiorly of housing 12 with an outlet region 90 that is bounded by side walls 66, by each working element 44 and 46, and by the portion of plate 14 adjacent the curved bottom surfaces 72. Passage 20 may be constricted at 92 to define a subsonic-supersonic nozzle for suitable expansion of the high temperature test gas.

Figure 4:
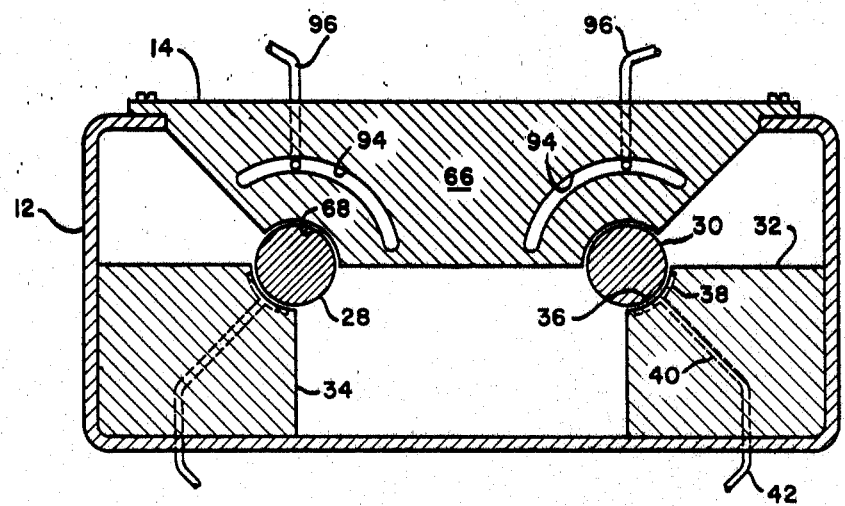
FIGURE 4 is a sectional view taken along line 4—4 of FIGURE 3.

To prevent leakage of the high temperature gas from outlet region 90 through the small clearance existing between the working members 44 and 46 and the depending side walls 66 of the cover plate, a pair of arcuate channels 94 are provided in each depending side wall 66 in a surface thereof that faces the working members as shown in FIGURES 3 and 4. Conduits 96 communicate with each channel 94 for supplying thereto pressurized air from a suitable source (not shown), the pressure of which is at least equal to the pressure in outlet region 90 acting as a fluid barrier to effectively block the escape of high temperature gas therefrom.

The inlet supply conduits 16 and 18 are located in cover plate 14 and communicate with the interior of casing 12 at a point adjacent channel end surfaces 80. Cold test gas, such as air from a suitable source (not shown) is supplied to wells 52 of the working members via conduits 16 and 18.

The undersurface of plate 14 extending between throat 92 and inlet conduits 16 and 18 is coated with a layer of a highly heat reflective material 98 such as aluminum oxide, for example.

To cool the lobes and wells of the working members as they rotate out of the high temperature region 90, a suitable coolant supply manifold 104 may be located transversely of the interior of casing 12, containing a plurality of discharge coolant spray nozzles 106 for supplying a coolant under pressure such as wet steam to the external portions of the working members as they rotate out of outlet region 90. A coolant exit duct 108 communicates with the bottom volume of casing 12 and functions to remove the coolant from the wells of the working members before exposure thereof to the inlet passages. Duct 108 may advantageously communicate with a source of vacuum to thoroughly dry the surface of the wells.

As clearly illustrated, the coolant fluid is prevented from mixing with the inlet gaseous fluid and the heated gaseous fluid by means of the close spaced relation between each of the working elements and between the working elements and the curved interior surfaces 72. In this manner the coolant functions to cool the heated parts of the apparatus without having a direct cooling effect on the gaseous fluid, which would reduce the efficiency of the apparatus as a heater.

In the operation, the multirecompression heater working elements 44 and 46 are driven to rotate, respectively, clockwise and counterclockwise toward outlet region 90. As the volume in each well 52 approaches the area of the curved surfaces 72, it becomes completely enclosed thereby and by the side wall members 66. This well volume remains enclosed until it becomes exposed to the outlet region 90. These regions of enclosure between the region 90, and depending side walls 66 will be hereinafter termed the recompression chambers.

The length of the recompression chamber is greater than the circumferential length of two lobe elements 50 so that one lobe is always in the recompression chamber. Except for slight leakage between the lobe 50, the curved surface 72 and side walls 66, there is no flow from region 90 contrary to the motion of working elements 44 or 46 back to the low pressure region adjacent duct 108. Furthermore, as the working elements rotate in synchronism the lobe of one element, in principle, completely displaces all of the gas in the mating well volume of the other elements forcing it into region 90. Actually, there must be a small clearance between elements 44 and 46 and some gas will leak to the low pressure region.

Gas flow enters the each well volume through inlets 16 and 18. Actually some additional amount of gas is brought into the wells by virtue of the gas that occupies each well volume as it rotates into the recompression chamber. When the low pressure region is exhausted to a suitable vacuum storage vessel through exhaust duct 108, the quantity of gas that occupies the wells upon their entry into the recompression chamber is negligibly small.

The overall energy balance between the work input and the enthalpy increase of the test gas is as follows. The amount of work done for each revolution of the elements 44 and 46 is equal to the pressure in outlet region 90 times the total displaced volume of gas into that region, which in turn is equal to the total number of wells 52 times the volume of each well. The increase in specific energy of the test gas can be determined by simply dividing the work done per rotation by the gas input per rotation.

While these overall energy relations must be valid, it is instructive to look into detail at the thermodynamic heating processes involved.

As each low pressure well volume 52 becomes exposed to the high pressure outlet region 90, some elements of the gas therein throttle or expand into the low pressure wells. As this well filling process continues, the gas elements that entered the well and were throttled to low pressure become recompressed back to the outlet region pressure by the action of successive gas elements. A gas element does not lose any of its energy as it throttles into the well volume (except for heat transfer) but it gains energy in the recompression process by the action of all of the gas elements which follow it and serve to recompress it. Each throttle-fill and recompression process serves to raise the overall energy level of the gas elements that enter the well. On the average, each element of gas enters into several fill and recompression processes before it finally leaves the outlet region as part of the test gas. Hence, the name, multirecompression heater.

The pressure in outlet region 90 is maintained by the expulsion of the gas elements that fill each well by the mating action of elements 44 and 46. The work required for this displacement action is provided by external shafts 28 and 30 driven by motors 56.

Thus far, the leakage aspects of the heater have not been discussed. They play an important role in the heater design. It is necessary and obvious that if there is to be any net test flow that the leak rate must be less than the rate at which gas is delivered to the outlet region 90. The delivery rate is more or less fixed by the mass energy consideration that the enthalpy of the test gas is a function of the power input of elements of 44 and 46 and the flow rate of the test gas. It is not possible to offset leakage effects simply by increasing the gas delivery rate while yet maintaining a desired test gas energy level. Thus, it is necessary that the leakage rate be small compared to the delivery rate corresponding to a desired test gas enthalpy.

To accomplish this objective it is advantageous to make the speed of the working elements as high as practical to minimize the time in which leakage may take place. Another way of stating this objective is that the displacement rate must be high compared to the leak rate. Specifically, for high temperature air generation in the 3000° F. to 12,000° F. temperature range it is desirable to employ tip speeds of the lobe elements 50 on the order of 400 to 1000 feet per second. At such speeds it is possible to accept small but practical clearances between elements that give rise to leakage losses. It is obvious that with these high speeds, a tight seal rubbing contact design is not practical. Hence, the small, but finite clearances are a necessary aspect to heater design.

There are three separate sources of leakage, to wit, the gas flow between the lobe elements 50 and the top of the recompression chamber, the gas flow between the meshing of elements 44 and 46 on the line of contact between their centers, and the gas flow between the gear-type elements 44 and 46 and the side wall members 66. This third source of leakage is eliminated by the provision of the arcuate recesses 94 and the air supply conduits 96 communicating therewith.

A pressure controlled regulation will flow air into each of these recesses through line 96 so that the pressure therein is equal to or slightly greater than the pressure of the working gas in region 90. This will eliminate the flow of hot working gas through this leak source.

The outlet region 90 and the portion of the recompression chamber joining this region are the areas that give rise to high heat transfer rates to the working members 44 and 46. The lobes 50 and wells 52 are cooled as they rotate below the line of contact by a cooling spray from nozzles 106. This provides for cooling directly on to surfaces which are heated. Hence, in the high stress rotating working members it is not necessary to provide for internal cooling.

The stationary surfaces of high heat flux, namely, the fingers 70 and other adjacent surfaces of the cover plate and casing are internally cooled by the circulating coolant through channels 76.

In addition, the coating material 98 that is made a part of the casing cover plate 14 functions to reduce the heat loss of the test gas by reducing the heat transfer to the cover plate due to the highly reflective nature of the material. The coating 54 on the working members 44 and 46 functions similarly to prevent heat loss from the outlet region thereto.

Figure 2:
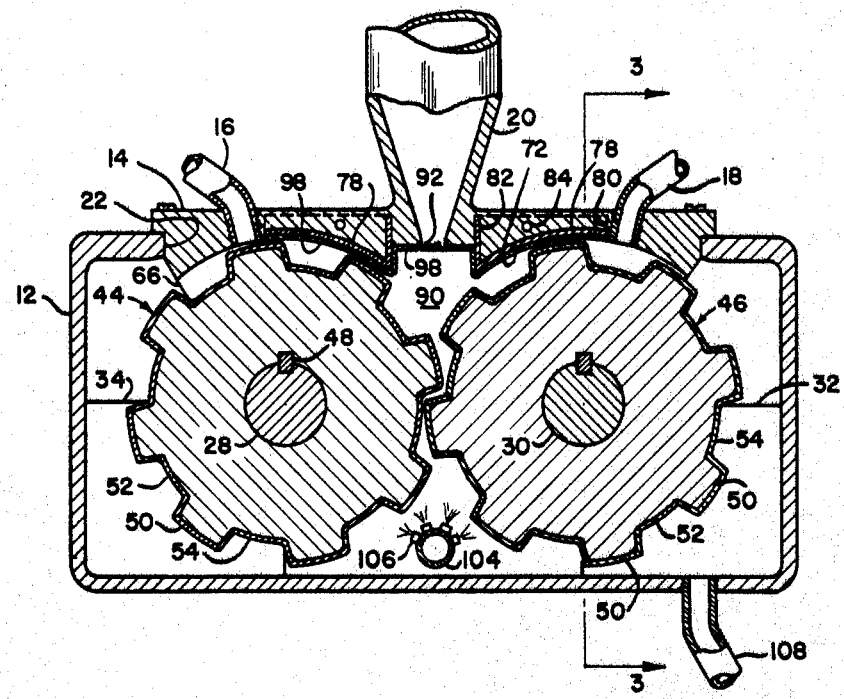
FIGURE 2 is a sectional view taken along line 2—2 of FIGURE 1.

An important aspect of design is revealed in a study of the pressure loadings on working elements 44 and 46. Referring to FIGURES 2 and 4, it may be seen that the high pressure loads in the outlet region act to push apart the two working elements. This tendency would ordinarily be overcome by loadings on the shafts 28 and 30 of elements 44 and 46 by conventional end bearings (not shown). At the speeds and loadings necessary in the design for generation of high temperature hypersonic test gas the combination of loading on the elements 44 and 46 is extremely high; to relieve the conventional bearings of much of the loading they must carry, the two pair of air bearings 32 and 34 are employed to act on both sides of the working elements. High pressure gas is made to pass through passages 40 to recesses 38 to provide the required additional support.

Figure 5:
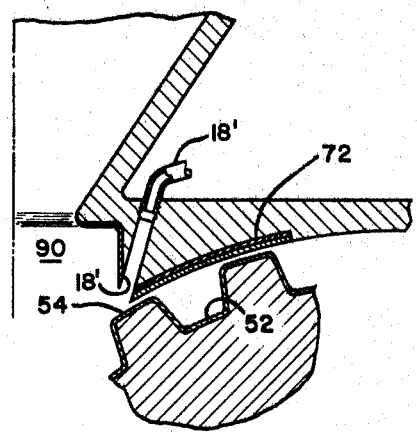
FIGURE 5 is a fragmentary sectional view similar to FIGURE 2 illustrating a modified inlet supply arrangement.

In the modification illustrated in FIGURE 5, instead of locating the inlet conduits adjacent the surfaces 80, they are located substantially at the joinder of the curved surface 72 with the outlet region 90 as illustrated at 18'. In this manner the inlet flow communicates directly with the outlet region and therefore must come in at a pressure slightly higher than that in the outlet region. As this gas enters the outlet region a portion of it will flow backwards through the clearance between the cover plate at the working members over the surface 54 and into the wells 52, but since this entering gas is relatively cold it performs the advantageous function of providing a cooling effect for the surfaces of the working members and recompression chamber wells.

With the FIGURES 1–4 and the FIGURE 5 embodiments it is possible to achieve outlet region temperatures of 3,000° F. to 12,000° F. at 10 atmospheres to 160 atmospheres, when the pressure in the wells of the working members immediately before they enter the outlet region is one atmosphere at room temperature. For example, at 12,000° F. outlet temperature the required tip speed would be about 800 feet per second, at a working member r.p.m. of 5700 for a 32-inch pitch diameter.

Whereas the foregoing description centered about the operation of the present apparatus as a heater it is obvious that certain high temperature compressor and/or expander operations are possible. This is especially true for the FIGURE 2 embodiment where there is compression of the gaseous fluid.

Although two preferred embodiments of the present invention have been illustrated and described, other modifications thereof will occur to those skilled in the art. It is therefore intended that the invention be limited only by the scope of the appended claims.

I claim:
1. A device of the character described, comprising;
 (a) a housing
 (b) mating working elements rotatably mounted in said housing and comprising a pair of cylindrical gear members each having spaced peripheral lobes separated by peripheral wells,
 (c) means for driving said working elements,
 (d) inlet passage means for delivering a low temperature gaseous fluid to the interior of said housing,
 (e) a high temperature outlet region intermediate said working elements and bounded by external portions of said working elements and by a portion of said housing, and in direct communication with said inlet passage means,
 (f) the portion of said housing adjacent said outlet region having curved interior surfaces following the contours of said working elements, and

(g) outlet passage means communicating with said outlet region for delivering high temperature gaseous fluid to a point of use.

2. The device according to claim 1, wherein;
(h) said driving means rotates said working elements at such a rate to impart to the tips thereof linear velocities in the range of 300 to 1000 feet per second, and
(i) wherein the temperature in said outlet region is greater than 2000° F.

3. The device according to claim 2, wherein;
(j) said means for driving said working elements includes synchronizing gears located externally of said housing and being precision machined to maintain a close spaced relationship between said working elements.

4. The device according to claim 2, further comprising;
(j) means for supplying under externally derived pressure a coolant fluid directly to said external portions of said working elements after said portions rotate out of said outlet region, and
(k) means to remove to an external receiver substantially all of said coolant fluid from the wells of said working elements before exposure thereof to said inlet passage means.

5. The device according to claim 4, further comprising;
(l) cooling ducts contained within said interior curved surfaces of said housing.

6. The device according to claim 5, wherein;
(n) said interior curved surfaces, said housing outlet region and said working elements are coated with a layer of a highly heat reflective material.

7. The device according to claim 1, wherein;
(i) said inlet passage means communicates directly with said high temperature outlet region substantially at the point where said interior curved surfaces join said region.

8. A device of the character described, comprising;
(a) a housing,
(b) mating working elements rotatably mounted in said housing and comprising a pair of cylindrical gear members each having spaced peripheral lobes separated by peripheral wells,
(c) means for driving said working elements,
(d) inlet pasage means for delivering a low temperature gaseous fluid to the interior of said housing,
(e) a high temperature outlet region intermediate said working elements and bounded by external portions of said working elements and by a portion of said housing,
(f) the portion of said housing adjacent said outlet region having curved interior surfaces following the contours of said working elements,
(g) outlet passage means communicating with said outlet region for delivering high temperature gaseous fluid to a point of use, and
(h) said interior curved surfaces, said housing outlet region, and said working elements are coated with a layer of a material having a high heat reflectivity such as aluminum oxide.

9. The device according to claim 8, further comprising;
(i) means for supplying under externally derived pressure a coolant fluid directly to said external portions of said workng elements after said portions rotate out of said outlet region, and
(j) means to remove to an external receiver substantially all of said coolant fluid from the wells of said working elements before exposure thereof to said inlet passage means.

10. A device of the character described, comprising;
(a) a housing,
(b) mating working elements rotatably mounted in said housing and comprising a pair of cylindrical gear members each having spaced peripheral lobes separated by peripheral wells,
(c) means for driving said working elements,
(d) inlet passage means for delivering a low temperature gaseous fluid to the interior of said housing,
(e) a high temperature outlet region intermediate said working elements and bounded by external portions of said working elements and by a portion of said housing,
(f) the portion of said housing adjacent said outlet region having curved interior surfaces following the contours of said working elements,
(g) outlet passage means communicating with said outlet region for delivering high temperature gaseous fluid to a point of use,
(h) said means for driving said working elements includes synchronizing gears located externally of said housing and being precision machined to maintain a close spaced relationship between said working elements, and
(i) air bearings to support said working members on an area thereof that is substantially diametrically opposed to said outlet region.

11. The device according to claim 10, wherein;
(j) said working members have side faces in close spaced relation to side walls of said housing,
(k) said housing side walls contain arcuate channels, and there is further provided;
(l) means for supplying fluid under pressure to said arcuate channels to thereby present a fluid barrier against leakage from said high temperature outlet region.

12. The device according to claim 11, further comprising;
(m) means for supplying under externally derived pressure a coolant fluid directly to said external portions of said working elements after said portions rotate out of said outlet region,
(n) means to remove to an external receiver substantially all of said coolant fluid from the wells of said working elements before exposure thereof to said inlet passage means,
(o) cooling ducts contained within said interior curved surface of said housing, and wherein;
(p) said inlet passage means communicates directly with said high temperature outlet region, and
(q) said interior curved surfaces, said housing outlet region and said working elements are coated with a layer of material that is highly reflective.

13. A device of the character described, comprising;
(a) a housing,
(b) mating working elements rotatably mounted in said housing and comprising a pair of cylindrical gear members each having spaced peripheral lobes separated by peripheral wells,
(c) means for driving said working elements,
(d) inlet passage means for delivering a low temperature gaseous fluid to the interior of said housing,
(e) a high temperature outlet region intermediate said working elements and bounded by external portions of said working elements and by a portion of said housing,
(f) the portion of said housing adjacent said outlet region having curved interior surfaces following the contours of said working elements,
(g) outlet passage means communicating with said outlet region for delivering high temperature gaseous fluid to a point of use,
(h) said means for driving said working elements includes synchronizing gears located externally of said housing and being precision machined to maintain a close spaced relationship between said working elements, (i) side faces on said working elements in close spaced relation to side walls of said housing, (j) arcuate channels in said housing side walls, and (k) means for supplying fluid under pressure to said arcuate channels to thereby present a fluid barrier against leakage from said high tempearture outlet region.

14. A device of the character described, comprising;

(a) a housing, (b) mating working elements rotatably mounted in said housing and comprising a pair of cylindrical gear members each having spaced peripheral lobes separated by peripheral wells, (c) means for driving said working elements, (d) a high temperature outlet region intermediate said working elements and bounded by external portions of said working elements and by a portion of said housing, (e) the portion of said housing adjacent said outlet region having curved interior surfaces following the contours of and closely spaced to said working elements, (f) inlet passage means for delivering a low temperature gaseous fluid to the interior of said housing at said curved interior surfaces, (g) said housing and said working elements defining a bottom region opposite said outlet region, (h) means for substantially blocking fluid communication between said bottom region and said outlet region, (i) means for substantially blocking fluid communication between said bottom region and said inlet passage means, and (j) means for exposing said bottom region to a pressure that differs from that of said inlet passage means.

15. The device according to claim 14, wherein;

(i) said driving means rotates said working elements at such a rate to impart to the tips thereof linear velocities in the range of 300 to 1000 feet per second, and (j) wherein the temperature in said outlet region is greater than 2000° F.

16. A device of the character described, comprising;

(a) a housing, (b) mating working elements rotatably mounted in said housing and comprising a pair of cylindrical gear members each having spaced peripheral lobes separated by peripheral wells, (c) means for driving said working elements, (d) inlet passage means for delivering a low temperature gaseous fluid to the interior of said housing, (e) a high temperature outlet region intermediate said working elements and bounded by external portions of said working elements and by a portion of said housing, (f) the portion of said housing adjacent said outlet region having curved interior surfaces following the contours of said working elements, (g) outlet passage means communicating with said outlet region for delivering high temperature gaseous fluid to a point of use, (h) coolant fluid containing ducts located within said interior curved surfaces of said housing, and (i) means preventing communication between said ducts and the interior of said housing.

References Cited

UNITED STATES PATENTS

| Re. 25,567 | 5/1964 | Lorenz | 230—141 |
| 1,118,533 | 11/1914 | Crocker. | |
| 3,129,877 | 4/1964 | Nilsson et al. | 230—143 |
| 3,241,744 | 3/1966 | Schibbye et al. | 230—143 |

DONLEY J. STOCKING, Primary Examiner

W. J. GOODLIN, Assistant Examiner

U.S. Cl. X.R.

230—210